(12) United States Patent
Engel et al.

(10) Patent No.: US 7,330,917 B2
(45) Date of Patent: Feb. 12, 2008

(54) DECIMATION OF FIXED LENGTH QUEUES HAVING A NUMBER OF POSITION FOR HOLDING DATA WHEREIN NEW DATA IS FAVORED OVER OLD DATA

(75) Inventors: Glenn R Engel, Snohomish, WA (US); Bruce Hamilton, Menlo Park, CA (US)

(73) Assignee: Agilent Technologies, Inc., Santa Clara, CA (US)

( * ) Notice: Subject to any disclaimer, the term of this patent is extended or adjusted under 35 U.S.C. 154(b) by 46 days.

(21) Appl. No.: 11/295,015

(22) Filed: Dec. 6, 2005

(65) Prior Publication Data

US 2006/0075163 A1 Apr. 6, 2006

Related U.S. Application Data

(63) Continuation of application No. 10/180,801, filed on Jun. 26, 2002, now abandoned.

(51) Int. Cl.
*G06F 3/00* (2006.01)
*G06F 15/00* (2006.01)
*G06F 13/00* (2006.01)

(52) U.S. Cl. ............... 710/54; 710/65; 710/1; 710/20; 710/30; 710/35; 710/52; 711/126; 711/219; 712/34; 712/225

(58) Field of Classification Search ............ 710/1, 710/20, 30, 35, 52, 65, 54; 712/225, 34; 711/126, 219
See application file for complete search history.

(56) References Cited

U.S. PATENT DOCUMENTS

| | | | | |
|---|---|---|---|---|
| 5,526,353 | A * | 6/1996 | Henley et al. | 370/392 |
| 6,018,754 | A * | 1/2000 | Chen et al. | 708/316 |
| 6,061,749 | A * | 5/2000 | Webb et al. | 710/65 |
| 6,237,079 | B1 * | 5/2001 | Stoney | 712/34 |
| 6,397,092 | B1 * | 5/2002 | Norris et al. | 600/323 |

* cited by examiner

*Primary Examiner*—Tammara Peyton

(57) ABSTRACT

Decimation of data from a fixed length queue retaining a representative sample of the old data. Exponential decimation removes every nth sample. Dithered exponential decimation offsets the exponential decimation approach by a probabilistic amount. Recursive decimation selects a portion of the queue and removes elements.

19 Claims, 2 Drawing Sheets

*Fig. 1*
*Fig. 2*

DECIMATION OF FIXED LENGTH QUEUES HAVING A NUMBER OF POSITION FOR HOLDING DATA WHEREIN NEW DATA IS FAVORED OVER OLD DATA

This is a continuation of application Ser. No. 10/180,801 filed on Jun. 26, 2002 now abandoned, the entire disclosure of which is incorporated herein by reference.

BACKGROUND OF THE INVENTION

1. Field of the Invention

The present invention deals with fixed-length queues in computer hardware and software. More specifically, the present invention deals with techniques for managing fixed-length queues when they become full.

2. Art Background

Many systems use fixed-length queues to buffer data between a data producer and a data consumer. If the consumer is not able to consume data as fast as the producer places it in the queue, or is unable for some reason to take data from the queue or empty the queue, the queue can become full. The queue management system, hardware or software, must have policies in place for dealing with queue overflow situations.

Traditional approaches to queue overflow include techniques such as overwriting the last item, dropping the oldest item, or discarding the newest item. The choice is usually made based on the needs of the application and the presumed importance of new data versus old data.

SUMMARY OF THE INVENTION

Techniques for decimation, the removal of old data, from a fixed length queue retain a representative sample of the data. Exponential decimation removes every nth sample. Dithered exponential decimation applies an offset to the exponential decimation approach. Recursive random decimation selects a portion of the queue and removes elements, and recurses on the remaining portion of the queue.

BRIEF DESCRIPTION OF THE DRAWINGS

The present invention is described with respect to particular exemplary embodiments thereof and reference is made to the drawings in which:

FIG. 1 shows a fixed length queue,

FIG. 2 shows exponential decimation in a fixed length queue, and

DETAILED DESCRIPTION

Figure 3:
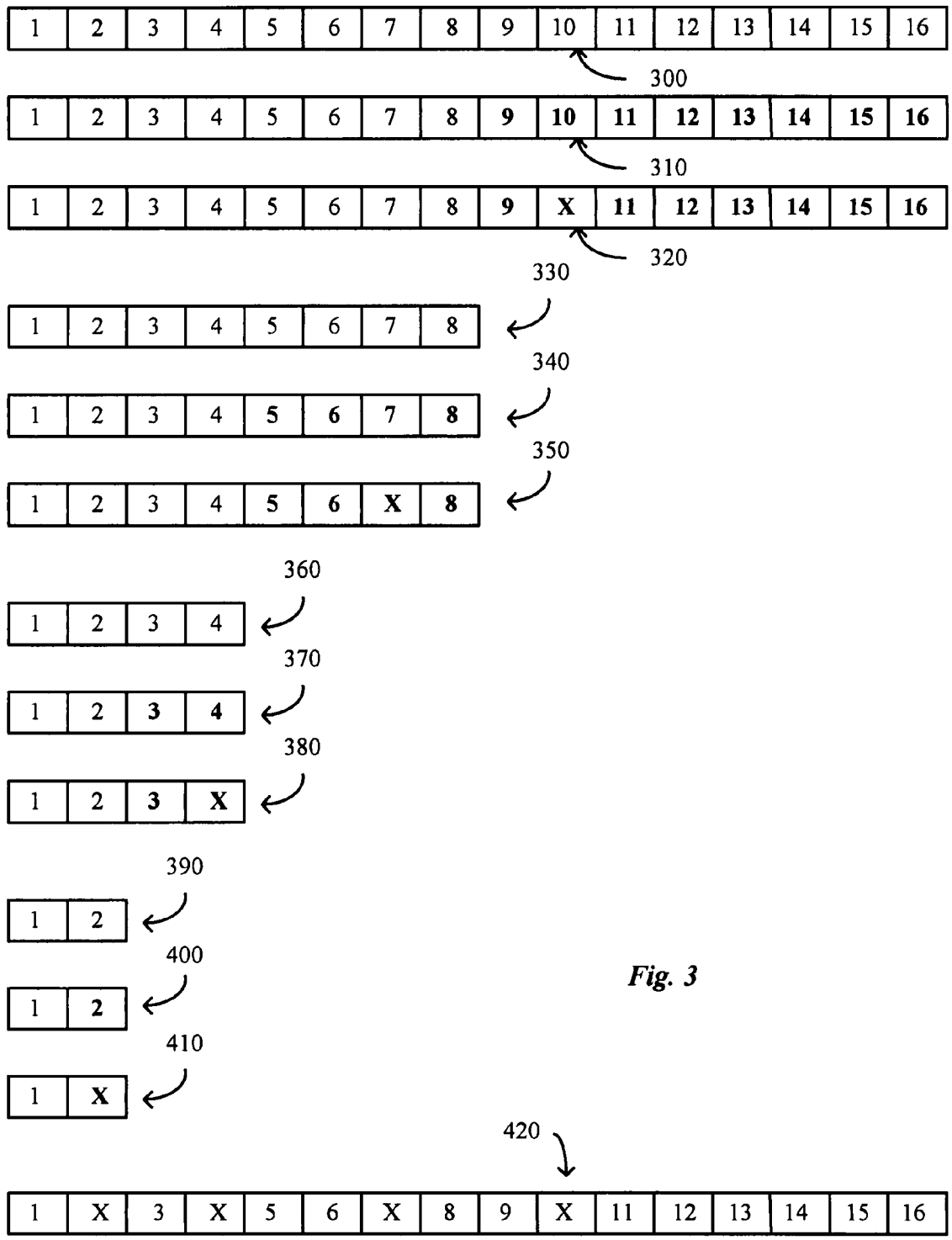
FIG. 3 shows recursive decimation in a fixed length queue.

FIG. 1 shows a fixed length queue 100 of 10 elements, where each item in the queue is represented by its sample number. Element 1 is the oldest element in the queue, element 2 the next oldest, and so on through element 10 which is the newest. Queue 100 is full. When a new item arrives, either the new item must be discarded, or room must be made for it in the queue. Prior art solutions to adding a new item to a full queue include discarding the new item, and overwriting the most recently added item. The approach used depends on the needs of the application, and the presumed importance of old data versus new data.

Decimation as taught by the present invention trades reduced accuracy for increased apparent size of the queue. For example, if a 60 element queue contains samples taken every second, the queue when full holds samples spanning a minute, with one sample for every second in that minute. After many rounds of applying the decimation techniques according to the present invention, the same 60 element queue holds data covering a time span equivalent to that of a queue many times that size. However, the queue no longer contains a sample for each second of that time span.

The embodiments of the present invention may be implemented in a wide range of software, ranging from microcode or very low-level implementations to high-level language implementations. Embodiments of the present invention may also be implemented directly in hardware.

It should be understood that truly random numbers are very difficult to generate, and that the term random in this context is understood to be a shorthand for pseudorandom numbers. The generation of pseudorandom numbers is well understood in the art, described at length for example in Chapter 3 of *The Art of Computer Programming* by Donald E. Knuth.

Exponential decimation removes samples from the queue in such a way that old data is removed at the expense of new data, while still maintaining a representative sampling of the old data. An example of exponential decimation is shown in FIG. 2. Fixed length queue 200 is full. Exponential decimation by n=2 removes every second sample before adding a new item, removing items 2, 4, 6, 8, and 10 from queue 200 to produce queue 210 New samples are added until the queue once again is full, shown in 220. Decimation is repeated and a new sample added, removing every second item, namely items 3, 7, 11, 13, and 15, producing queue 230. As decimation continues, the distribution of the data becomes exponential in nature.

Exponential decimation can also be applied with divisors other than n=2 and can begin with any item in the queue, effectively adjusting the exponential rate of decay of old data in the queue. While exponential decimation may be applied to a queue removing multiple elements at one time, as shown in FIG. 2, it may also be practiced removing one element at a time. This requires that the decimation process retain state between invocations. As an example, consider the case of a 10 element queue and divisor n=2. The first time the decimation process is called, the item in position 2 of the queue is removed. The next time the decimation process is called, the item in position 4 of the queue is removed, then the item in position 6, then the item in position 10, and then the item in position 2 once again. Applying the decimation process gradually in this manner essentially allows the queue to remain full at all times once it has initially been filled, eliminating old items only when necessary Exponential decimation may also be dithered, probabilistically adding (or subtracting) a dither offset m to the sample position to be removed. At each position a probability of offsetting is calculated. As an example with the case of exponential decimation with a divisor of n=2 and an offset of m=1, samples at positions 2, 5, 7, and 8 in the queue are removed, rather than positions 2, 4, 6, and 8. Dithered exponential decimation gives the same emphasis to old data, but is less susceptible to sample bias. In the general case of dithered exponential decimation where the divisor is n and the dither value is ±m, the distribution function should ideally be uniform with a zero mean, but any distribution will do.

Another method of removing data from a full queue according to the present invention is recursive decimation. This is shown in FIG. 3. 300 shows a full queue of 16 items. Recursive decimation begins by dividing the queue in half.

If the queue size is not an integer power of 2, some method can be used to make it a power of two in all rounds but the first. For example, assume the queue size is s and let $m=\lfloor \log_2(s) \rfloor$. Then the older "half" of the queue contains the oldest $2^m$ elements and the newer "half" contains the rest. Select the newer half of the queue, shown as 310 with items 9-16 in bold, and delete a point at random, shown in 320 with item 10 replaced by an X.

The process is repeated recursively with the remaining half of the queue, shown in 330. The newer half is selected, items 5-8 in 340. An element is deleted at random, item 7 replaced by an X in 350. Recursive decimation continues in the same fashion with 360-380.

390-410 represent the end of the recursive process. When the queue size being examined is equal to two, one of the elements is deleted at random and the recursive process terminated.

The overall result of this example of random recursive decimation is shown as 420. As with exponential decimation, recursive decimation may be applied over the entire queue, recursively decimating successively smaller portions of the queue, or it may be applied one recursive round at a time, maintaining state between rounds. Again, applying the decimation process gradually in this manner essentially allows the queue to remain full at all times once it has initially been filled, eliminating old items only when necessary As stated, certain aspects of the computation are simplified if the queue length in recursive decimation is an integer power of 2. While a random number may be generated each time an element is to be deleted, if the queue size is indeed an integer power of 2, a single randomly generated number may suffice, since in a sufficiently random number all bits in a binary representation will be random.

As an example, consider a queue containing 64 elements. In the first recursion, a random position spanning items 33 to 64 must be selected, requiring a random number in the range of 0-31. A random number is generated and five consecutive bits (either right most or leftmost) are selected to span the range 0-31. In the next round of recursion, the range needed is 0-15, so the next 4 bits of the random number are used. The next round uses 3 bits for a range of 0-7, the following round uses 2 bits for 0-3, and the final round uses 1 bit. In total then, 5+4+3+2+1=15 bits are needed in total. In general, the number of bits k needed for a queue of size n is:

$$k = \frac{\log(n)^2 - \log(n)}{2}$$

This approach generates a single random number and does not reuse bits. While the possibility of introducing sample bias is increased, an alternate approach is to generate a single random number with at least the number of bits required for the first round of recursion, and reuse that random number in succeeding rounds, selecting fewer bits for each round.

If the size of the queue is not an integer power of 2, random numbers may be generated individually for each round of recursive decimation, or a single random number may be generated and reused in successive stages, for example by taking the random number modulo the queue size at issue in each round.

The foregoing detailed description of the present invention is provided for the purpose of illustration and is not intended to be exhaustive or to limit the invention to the precise embodiments disclosed. Accordingly the scope of the present invention is defined by the appended claims.

We claim:

1. A method of managing a fixed-length queue having a number of positions for holding data items, the method comprising:
    as the queue becomes filled with data items one or more times, creating in the queue a distribution of data items that exponentially favors new data items over old data items, and which includes at least one old data item and one new data item, by
        decimating data items stored in different ones of the positions of the queue, to create spaces for new data items in the queue; and
        inserting the new data items in the created spaces.

2. A method as in claim 1, wherein said decimating comprises exponentially decimating.

3. A method as in claim 1, wherein said decimating comprises recursively decimating, by,
    recursively selecting a portion of the queue;
    randomly selecting a data item in each selected portion of the queue;
    decimating each randomly selected data item to create spaces for new data items in the queue; and
    inserting the new data items in the created spaces.

4. A method as in claim 2, further comprising shifting the created spaces toward an end of the queue before inserting the new data items.

5. A method as in claim 2, wherein exponentially decimating comprises removing a plurality of elements from the queue, each time the queue becomes filled with data items, to create a plurality of spaces for the new data items.

6. A method as in claim 2, wherein exponentially decimating comprises dithering to select the data items to be decimated.

7. A method as in claim 3, further comprising repeating the steps for recursively decimating.

8. A method as in claim 7, wherein randomly selecting data item comprises generating a pseudorandom number and using the generated pseudorandom number to select data item.

9. A method as in claim 3, wherein randomly selecting data item in a first portion of the queue comprises generating a pseudorandom number and using a first part of the generated pseudorandom number to select data item in the first portion of the queue.

10. A method as in claim 9, wherein randomly selecting a data item in a second portion of the queue comprises using a second part of the generated pseudorandom number to select data item in the second portion of the queue.

11. A method as in claim 3, further comprising shifting the created spaces toward an end of the queue before inserting the new data items.

12. An article of manufacture, comprising:
    at least one computer readable medium; and
    processor instructions contained on the computer readable medium, the instructions configured to be readable by at least one processor and to cause the processor to, as a fixed-length queue having a number of positions for holding data items becomes filled with data items one or more times, create in the queue a distribution of data items that exponentially favors new data items over old data items, and which includes at least one old data item and at least one new data item, by
　　decimating data items stored in different ones of the positions of the queue, to create spaces for new data items in the queue; and
　　inserting the new data items in the created spaces.

13. An article of manufacture as in claim 12, wherein the instructions cause the at least one processor to shift the created spaces toward an end of the queue before inserting the new data items.

14. An article of manufacture as in claim 12, wherein decimating comprises exponentially decimating.

15. An article of manufacture as in claim 14, wherein exponentially decimating comprises dithering to select the data items to be decimated.

16. An article of manufacture as in claim 12, wherein decimating comprises:
　　recursively selecting a portion of the queue;
　　randomly selecting a data item in each selected portion of the queue;
　　decimating each randomly selected data item to create spaces for new data items in the queue; and
　　a inserting new data items in the created spaces.

17. An article of manufacture as in claim 16, wherein randomly selecting a data item comprises generating a pseudorandom number and using the generated pseudorandom number to select data item.

18. An article of manufacture as in claim 16, wherein randomly selecting a data item comprises generating a pseudorandom number and using a first part of the generated pseudorandom number to select data item in the first portion of the queue.

19. An article of manufacture as in claim 18, wherein randomly selecting a data item in a second portion of the queue comprises using a second part of the generated pseudorandom number to select data item in the second portion of the queue.

* * * * *

UNITED STATES PATENT AND TRADEMARK OFFICE
CERTIFICATE OF CORRECTION

PATENT NO. : 7,330,917 B2 Page 1 of 1
APPLICATION NO. : 11/295015
DATED : February 12, 2008
INVENTOR(S) : Engel et al.

It is certified that error appears in the above-identified patent and that said Letters Patent is hereby corrected as shown below:

In column 4, line 42, in Claim 8, after "selecting" insert -- a --.

In column 4, line 45, in Claim 8, after "select" insert -- a --.

In column 4, line 48, in Claim 9, before "data" insert -- a --.

In column 4, line 50, in Claim 9, after "select" insert -- a --.

In column 4, line 55, in Claim 10, after "select" insert -- a --.

In column 6, line 3, in Claim 16, before "inserting" delete "a".

In column 6, line 12, in Claim 18, after "select" insert -- a --.

In column 6, line 17, in Claim 19, after "select" insert -- a --.

Signed and Sealed this

Eighth Day of July, 2008

JON W. DUDAS
*Director of the United States Patent and Trademark Office*